United States Patent
Mitsui

(10) Patent No.: US 7,817,294 B2
(45) Date of Patent: Oct. 19, 2010

(54) DATA PROCESSING APPARATUS, PRINT SETTING PROCESSING METHOD, STORING MEDIUM STORING COMPUTER-READABLE PROGRAM THEREIN, AND PROGRAM

(75) Inventor: Akihiro Mitsui, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1107 days.

(21) Appl. No.: 11/274,569

(22) Filed: Nov. 15, 2005

(65) Prior Publication Data

US 2006/0103868 A1    May 18, 2006

(30) Foreign Application Priority Data

Nov. 15, 2004 (JP) .............................. 2004-330475
Oct. 26, 2005 (JP) .............................. 2005-310795

(51) Int. Cl.
*G06F 3/12* (2006.01)
*G06F 3/00* (2006.01)
*G06K 15/00* (2006.01)

(52) U.S. Cl. ..................... 358/1.15; 358/1.14; 719/321; 719/329

(58) Field of Classification Search ........................ None
See application file for complete search history.

(56) References Cited

U.S. PATENT DOCUMENTS

| 6,240,215 | B1 * | 5/2001 | Salgado et al. ............... 382/254 |
| 6,661,530 | B1 * | 12/2003 | Munetomo et al. .......... 358/1.15 |
| 7,467,392 | B1 * | 12/2008 | Ludwig et al. ............... 719/328 |
| 2002/0054333 | A1 * | 5/2002 | Yamamoto et al. .......... 358/1.15 |
| 2002/0065807 | A1 * | 5/2002 | Kawamoto et al. .............. 707/1 |
| 2002/0161936 | A1 * | 10/2002 | Minagawa ...................... 710/1 |
| 2003/0076512 | A1 * | 4/2003 | Laughlin ..................... 358/1.2 |
| 2003/0117641 | A1 * | 6/2003 | Sugiyama ................... 358/1.14 |
| 2004/0105126 | A1 * | 6/2004 | Minowa et al. ............. 358/1.18 |

FOREIGN PATENT DOCUMENTS

JP        2002-202865         7/2002

* cited by examiner

*Primary Examiner*—Twyler L Haskins
*Assistant Examiner*—Mesfin Getaneh
(74) *Attorney, Agent, or Firm*—Cowan, Liebowitz & Latman, P.C.

(57) ABSTRACT

A data processing apparatus has an input unit to input settings which are used for a print process, a recognizing unit to execute a printer driver and recognize a conflict of the settings inputted to the input unit, and a notifying unit to notify an application of a reason of occurrence of the conflict recognized by the recognizing unit.

7 Claims, 9 Drawing Sheets

FIG. 8

STORING MEDIUM SUCH
AS FD/CD-ROM, ETC.

| DIRECTORY INFORMATION |
|---|
| 1ST DATA PROCESSING PROGRAM<br>PROGRAM CODE GROUP CORRESPONDING TO STEPS IN THE FLOWCHART SHOWN IN FIG. 5 |
| |

MEMORY MAP IN STORING MEDIUM

DATA PROCESSING APPARATUS, PRINT SETTING PROCESSING METHOD, STORING MEDIUM STORING COMPUTER-READABLE PROGRAM THEREIN, AND PROGRAM

BACKGROUND OF THE INVENTION

1. Field of the Invention

The invention relates to a data processing apparatus for transferring print data to a printer, a print setting processing method, a storing medium in which a computer-readable program has been stored, and the program.

2. Related Background Art

Hitherto, in the case where an application program which operates on a computer executes printing, it is a general method whereby together with a print start command, various settings which are necessary for the printing are transferred as parameters to a print processing related program such as a printer driver or the like. By transferring the various settings necessary for the printing as parameters from the program to the printer driver as mentioned above, a print output which is demanded by the program can be obtained. For example, refer to JP-A-2002-328757.

However, a range of kinds of setting values which can be designated in order to obtain the desired print output is what is called a very limited range regarding the designation of a paper feeding port of a sheet, the designation of a duplex/simplex print mode, or the like which is considered to be supportable by any printer. Even if the printer or the printer driver provides various kinds of functions, with respect to other useful functions which cannot be directly designated from the application program, it is necessary to open a user interface of the printer driver and designate them there.

Consequently, in such a dedicated application program or the like as to refuse a display of the user interface of the printer driver, there is such a problem that the functions which the printer or the printer driver has cannot be sufficiently used.

Therefore, in recent years, there has appeared such a printer driver that in order to enable the printer or the printer driver to be fully used, also with respect to the settings which depend on the kind of printer or printer driver, a special interface which can be used from the application is provided and when it is used, the setting of the function equivalent to the case of setting by the printer driver user interface can be made.

In the case of using such a special interface from the application, when a desired print setting is changed from the application, in such a situation that a contradiction to another print setting occurs, there is a case where the printer driver returns a notification showing that a setting change process cannot be executed to the application.

For example, it is assumed that the simultaneous use of both of a booklet print function and a duplex print function is a combination of the incompatible settings as printer functions. At this time, when the duplex print function is valid, if such a setting change process for validating the booklet print function is executed from the application by using the interface, a notification showing that the setting change cannot be performed is returned from the printer driver to the application.

In such a situation, since the application side cannot recognize the print setting to which the contradiction has occurred, there is such a problem that a desired print setting cannot be executed.

SUMMARY OF THE INVENTION

The invention is made to solve at least one of the above problems and it is an object of the invention to provide a mechanism to enable the application side to understand which contradiction has occurred among a plurality of inputted settings.

To accomplish the above object, according to the invention, there is provided a data processing apparatus comprising: an input unit adapted to input settings which are used for a print process; a recognizing unit adapted to execute a printer driver and recognize a conflict of the settings inputted to the input unit; and a notifying unit adapted to notify an application of a reason of occurrence of the conflict recognized by the recognizing unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a diagram for explaining the memory map of a storing medium to store various data processing programs which can be read by an image processing apparatus according to the invention.

DETAILED DESCRIPTION OF THE PREFERRED EMBODIMENTS

According to the invention, a contradiction occurring between a print setting of an application side and a function set by a printer driver is understood and it is possible to easily construct a print setting processing environment having excellent use convenience in which the print setting can be automatically changed to a print setting without the contradiction between the set function and the setting of the application side.

According to the invention, when the application makes the print setting and a desired setting cannot be made, since it is possible to recognize how to operate to reflect the desired setting, the application can finally reach the desired print setting.

The best modes for embodying the invention will now be described with reference to the drawings.

<Explanation of System Construction>

First Embodiment

Figure 1:
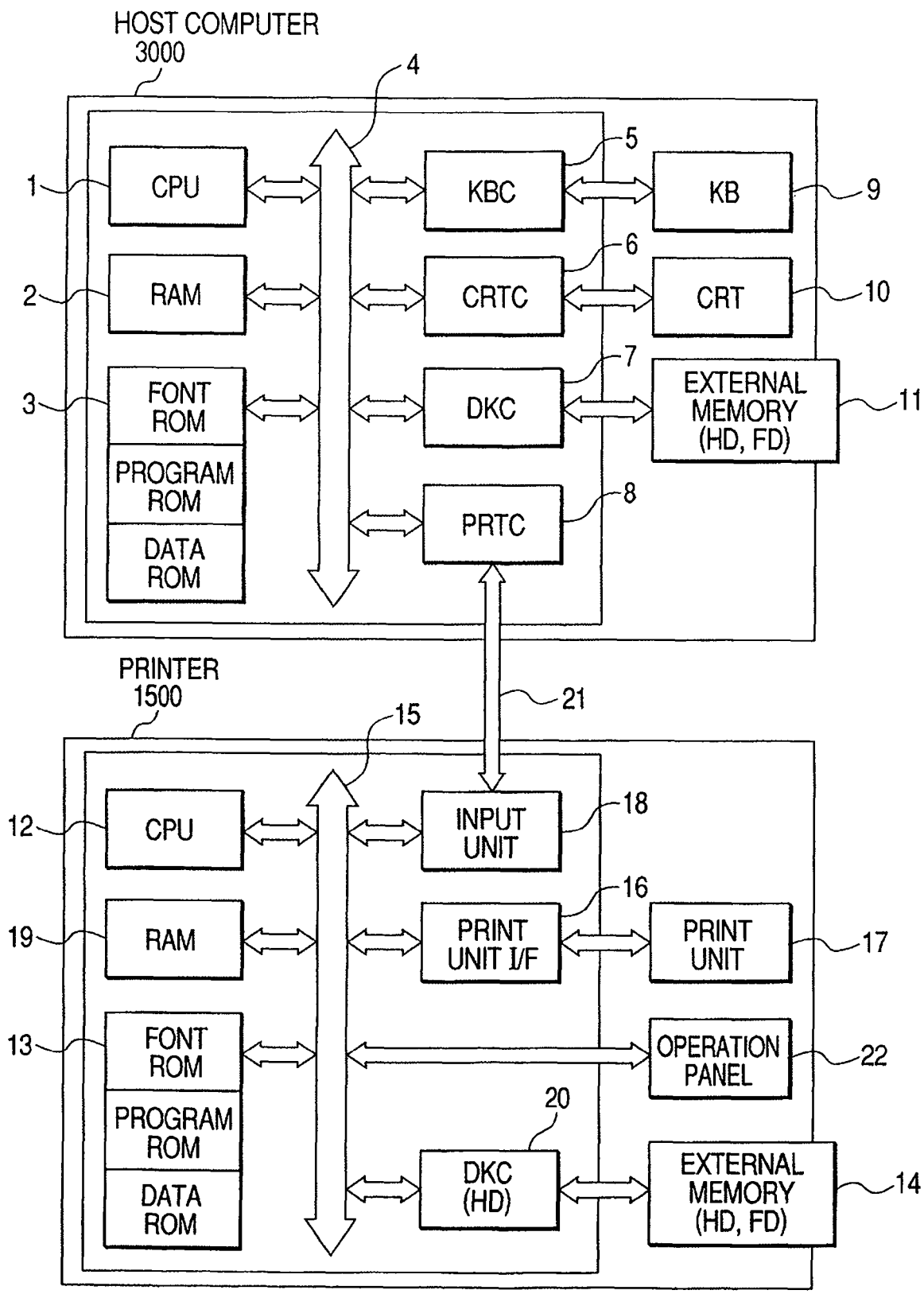
FIG. 1 is a block diagram for explaining a construction of a print processing system to which a data processing apparatus showing the first embodiment of the invention can be applied.

FIG. 1 is a block diagram for explaining a construction of a print processing system to which a data processing apparatus showing the first embodiment of the invention can be applied. Naturally, the invention can be applied to any one of a single apparatus, a system constructed by a plurality of apparatuses, and a system which is connected through a network such as LAN, WAN, or the like and executes processes so long as the functions of the invention are executed unless otherwise specified.

In FIG. 1, reference numeral 3000 denotes a host computer having a CPU 1 for executing a document process in which a figure, an image, characters, a table (including a spreadsheet or the like), and the like exist mixedly on the basis of a document processing program or the like stored in a program ROM in a ROM 3 or an external memory 11. The CPU 1 integratedly controls devices which are connected to a system bus 4.

An operating system program (hereinafter, abbreviated to OS) as a control program for the CPU 1 and the like are stored in the program ROM in the ROM 3 or the external memory 11. Font data and the like which are used in the document process are stored in a font ROM in the ROM 3 or the external memory 11. Various kinds of data which are used when the document process or the like is executed are stored in a data ROM in the ROM 3 or the external memory 11.

Reference numeral 2 denotes a RAM which functions as a main memory, a work area, or the like of the CPU 1; 5 a keyboard controller (KBC) for controlling a key input from a keyboard (KB) 9 or a pointing device (not shown); 6 a CRT controller (CRTC) for controlling a display of a CRT display (CRT) 10; and 7 a disk controller (DKC) for controlling an access to the external memory 11 such as hard disk (HD), flexible disk (FD), or the like for storing a boot program, various applications, font data, a user file, an edition file, a printer control command forming program (hereinafter, referred to as a printer driver), and the like.

Reference numeral 8 denotes a printer controller (PRTC) which is connected to a printer 1500 through a predetermined bidirectional interface 21 and executes a communication control process with the printer 1500. The CPU 1 executes a developing (rasterizing) process of, for example, an outline font into a display information RAM set in the RAM 2, thereby enabling "WYSIWYG" on the CRT 10.

The CPU 1 opens various registered windows on the basis of commands instructed by a mouse cursor or the like (not shown) on the CRT 10 and executes various data processes. When the printing is executed, the user opens the window regarding the print setting and can set the printer and a print processing method for the printer driver including selection of a print mode.

In the printer 1500, reference numeral 12 denotes a printer CPU for outputs an image signal as output information to a print unit (printer engine) 17 connected to a system bus 15 on the basis of a control program or the like stored in a program ROM in a ROM 13 or a control program or the like stored in an external memory 14.

The control program for the CPU 12 and the like are stored in the program ROM in the ROM 13. Font data and the like which are used when the output information is formed are stored in a font ROM in the ROM 13. Information and the like which are used on the host computer are stored in a data ROM in the ROM 13 in the case of the printer without the external memory 14 such as a hard disk or the like.

The CPU 12 can execute a communicating process with the host computer through an input unit 18 and notify the host computer 3000 of the information or the like in the printer. Reference numeral 19 denotes a RAM which functions as a main memory, a work area, or the like of the CPU 12. The RAM 19 is constructed so that a memory capacity can be expanded by an optional RAM which is connected to an expansion port (not shown).

The RAM 19 is used for an output information rasterizing area, an environmental data storing area, an NVRAM, or the like. An access to the external memory 14 such as hard disk (HD), IC card, or the like mentioned above is controlled by a disk controller (DKC) 20. The external memory 14 is connected as an optional device and stores font data, an emulation program, form data, and the like. Reference numeral 22 denotes an operation panel mentioned above. Switches for the operation, an LED display, and the like are arranged on the operation panel 22.

The number of external memories mentioned above is not limited to one but the external memory 14 can be also constructed in such a manner that at least one memory is provided and a plurality of external memories in each of which, besides the built-in fonts, an option font card and a program for interpreting printer control languages of different language systems have been stored can be connected. Further, the apparatus may also have the NVRAM (not shown) and store printer mode setting information from the operation panel 22.

Figure 2:
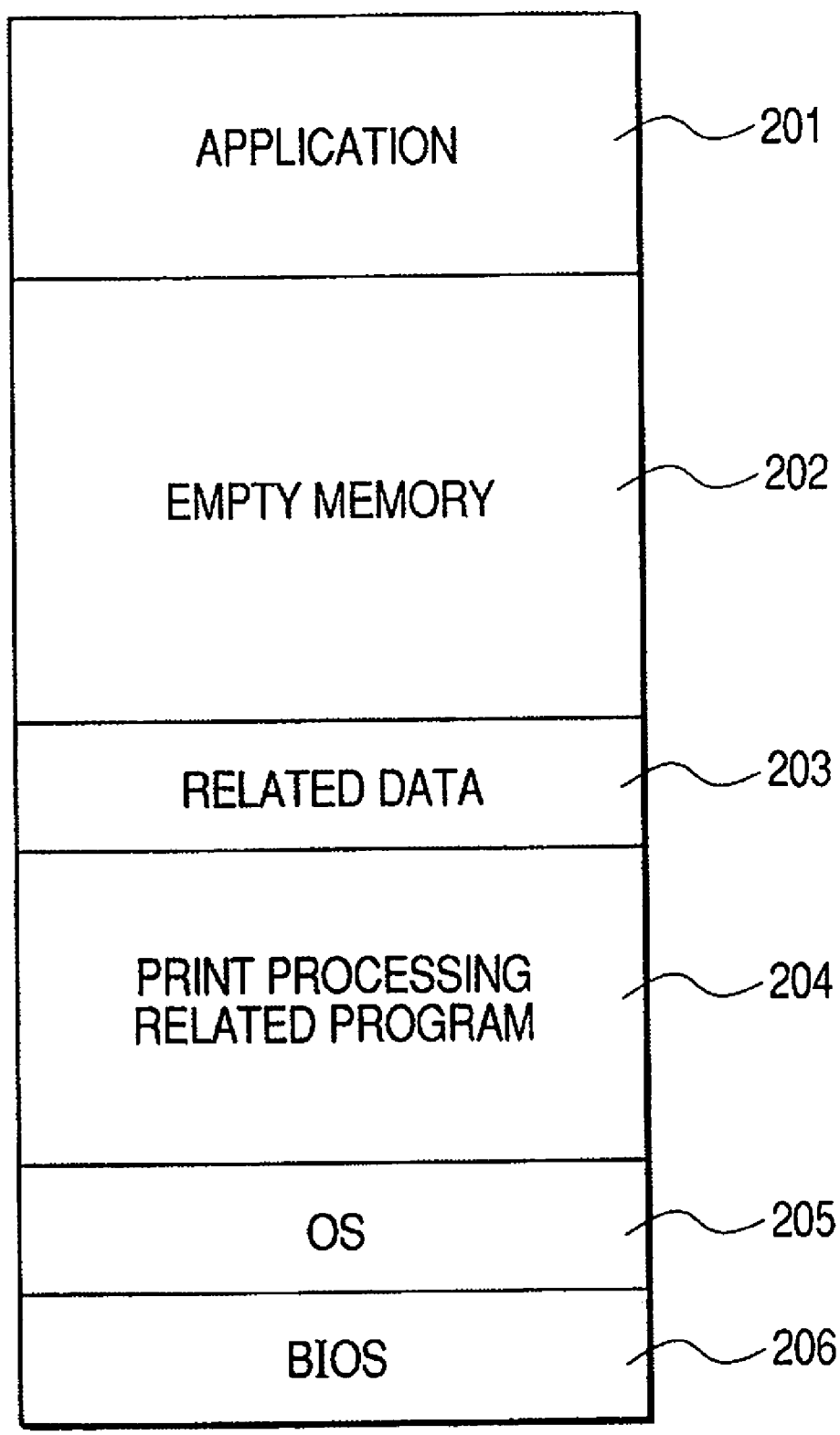
FIG. 2 is a diagram showing an example of a memory map in a RAM shown in FIG. 1.

FIG. 2 is a diagram showing an example of a memory map in the RAM 2 shown in FIG. 1. The memory map in the RAM 2 in the state where a predetermined application and a print processing related program have been activated and loaded into the RAM 2 on the host computer 3000 is shown.

Figure 3:
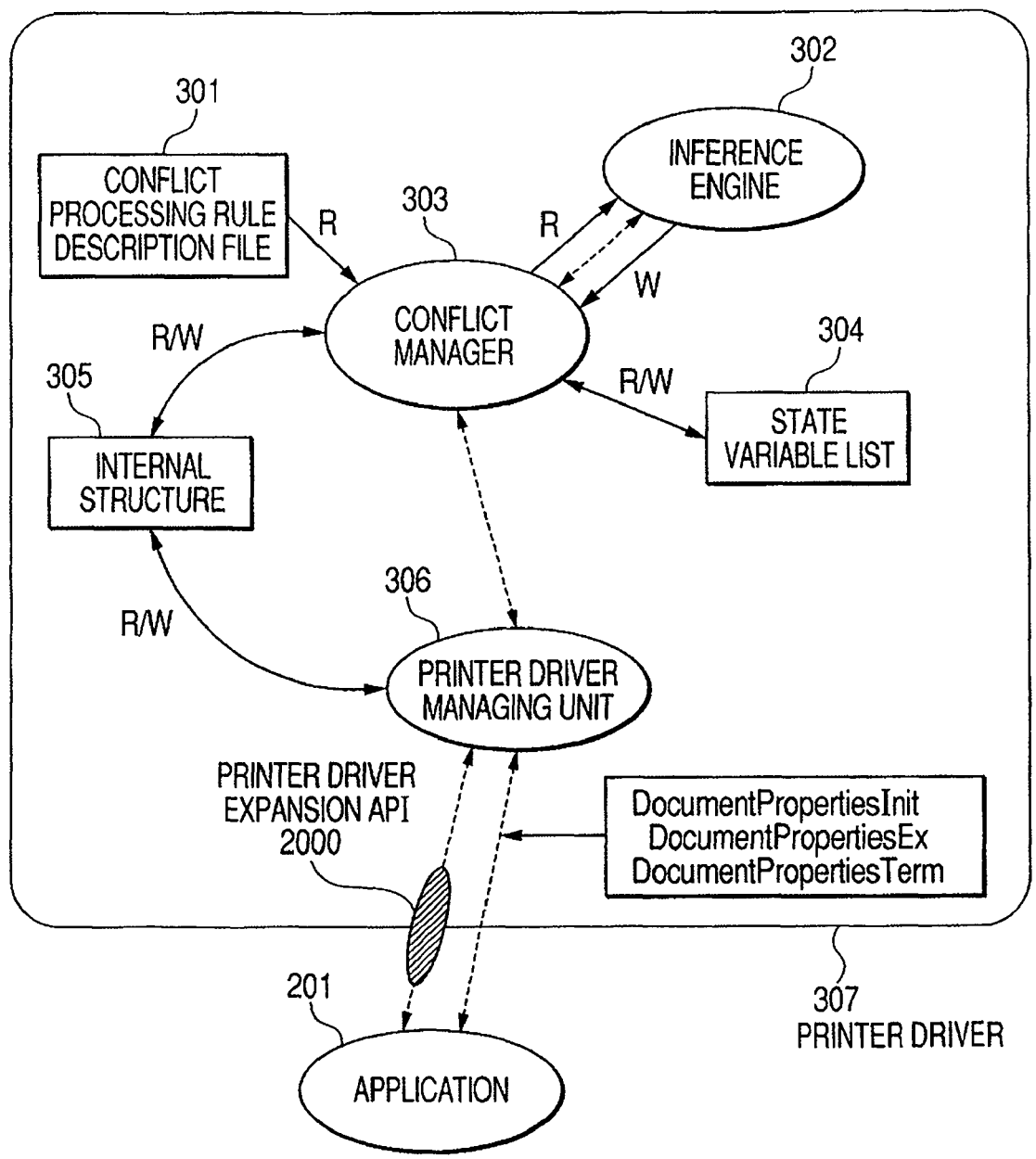
FIG. 3 is a diagram for explaining a concept of a schematic construction of an application and a print processing related program shown in FIG. 2.

In FIG. 2, as well as a BIOS 206 and an OS 205, an application 201, a print processing related program 204 (including a printer driver 307 and a printer driver expansion API 2000 in FIG. 3), and related data 203 have been loaded in the RAM 2 as shown in the diagram. Further, an empty memory area 202 (empty memory) is also assured in the RAM 2. Thus, the application 201 and the print processing related program 204 are in the execution possible state. The printer driver expansion API can be also installed as a part of the printer driver or a part of the operating system.

Communication between the printer driver and the application will be described with reference to FIG. 3.

In the embodiment, a system in which the printer driver can be expanded may be also used. That is, it is possible to use a construction in which a plug-in module as an ADD-IN program is added to the printer driver. The plug-in module may be constructed by: a UI plug-in having an expanding function of a UI driver; and a graphics driver having an expanding function of the graphics driver.

FIG. 3 is a diagram for explaining a concept of a schematic construction of the application 201 and the print processing related program 204 shown in FIG. 2 and the same component elements as those in FIG. 2 are designated by the same reference numerals.

In FIG. 3, reference numeral 301 denotes a conflict processing rule description file in which conflict processing rules showing an inconsistency avoiding strategy described in a description format, which will be explained hereinafter, are listed. Reference numeral 302 denotes an inference engine for loading the conflict processing rule description file 301, applying the conflict processing rules to the inputted setting values, and inferring a state of each function. Reference numeral 303 denotes a conflict manager for managing transmission/reception of data among the modules, updating of the data, and the like and integratedly controlling the conflicting process.

Reference numeral 304 denotes a state variable list which displays the states of the printer functions in a list format. The state variable list 304 can be updated on the basis of the input from the user and the contents in the conflict processing rule description file 301. Reference numeral 306 denotes a printer driver managing unit for controlling a series of processes from the application 201 upon printing and 305 indicates an internal structure as a business form which reflects the setting when the printer driver managing unit 306 executes the printing. The states of the printer functions are held in the internal structure 305 in an interlocking relation with the state variable list 304.

Figure 4:
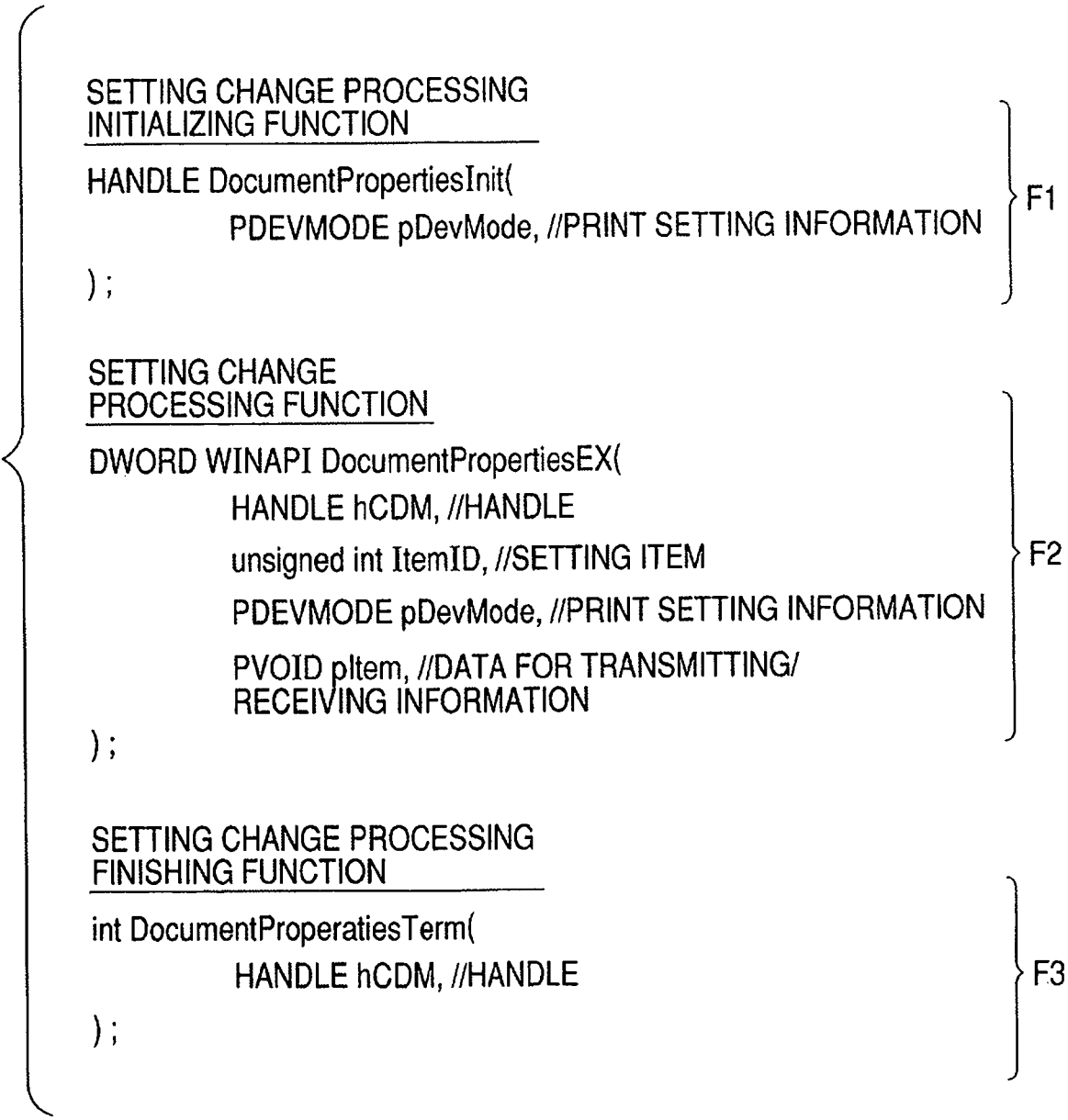
FIG. 4 is a diagram for explaining function information necessary for a setting change process opened by a driver managing unit shown in FIG. 3.

In the printer driver managing unit 306, print setting change processing related functions as shown in FIG. 4 are opened to the application 201. The application 201 loads those functions and executes a print setting change process. The printer driver 307 includes the above component elements 301 to 306.

The data processing apparatus which can hold the conflict processing rule to evaluate the functions which cannot be simultaneously set by the printer driver 307 shown in FIG. 3 as mentioned above executes a procedure shown in FIG. 5, which will be explained hereinafter. That is, when the print setting change is instructed to the printer driver 307 from the application 201, the data processing apparatus discriminates whether or not the print setting can be changed by obtaining the conflict processing rule in accordance with an inquiry by the printer driver 307 about the conflict, forms predetermined response information, for example, response information including the type of function which cannot be set, its reason, a solving measure, and the like, and notifies the application 201 of the formed predetermined response information from the printer driver 307 through the printer driver expansion API 2000.

As mentioned above, in the embodiment, the data to solve the reason why the application 201 cannot make the print setting at present can be returned to the application 201 together with a value of an error from the printer driver 307 through the printer driver expansion API.

The reason why the application 201 cannot make the print setting at present can be discriminated and returned by a method whereby "reason" is provided for a data structure of such a combination as to be "disable" in the conflict rule and information showing by which "reason" the combination finally becomes "disable" and the setting cannot be made is provided for the conflict manager 303. In this case, the following two kinds of data are returned:

"ID of the item which becomes "disable" because it has been set at the previous time"; and "List of IDs of the items whose setting change is necessary to solve the reason".

Thus, when the application 201 makes the print setting and cannot set as it desires, it is possible to recognize how to operate to reflect the desired setting by using which kind of method. Therefore, the application 201 can finally reach the desired print settings.

FIG. 4 is a diagram for explaining function information necessary for a setting change process opened by the printer driver managing unit 306 shown in FIG. 3. For example, the function information is stored in the data in the external memory 11 or ROM 3 shown in FIG. 1.

In FIG. 4, F1 denotes a setting change processing initializing function; F2 a setting change processing function; and F3 a setting change processing finishing function.

Figures 5, 5A:
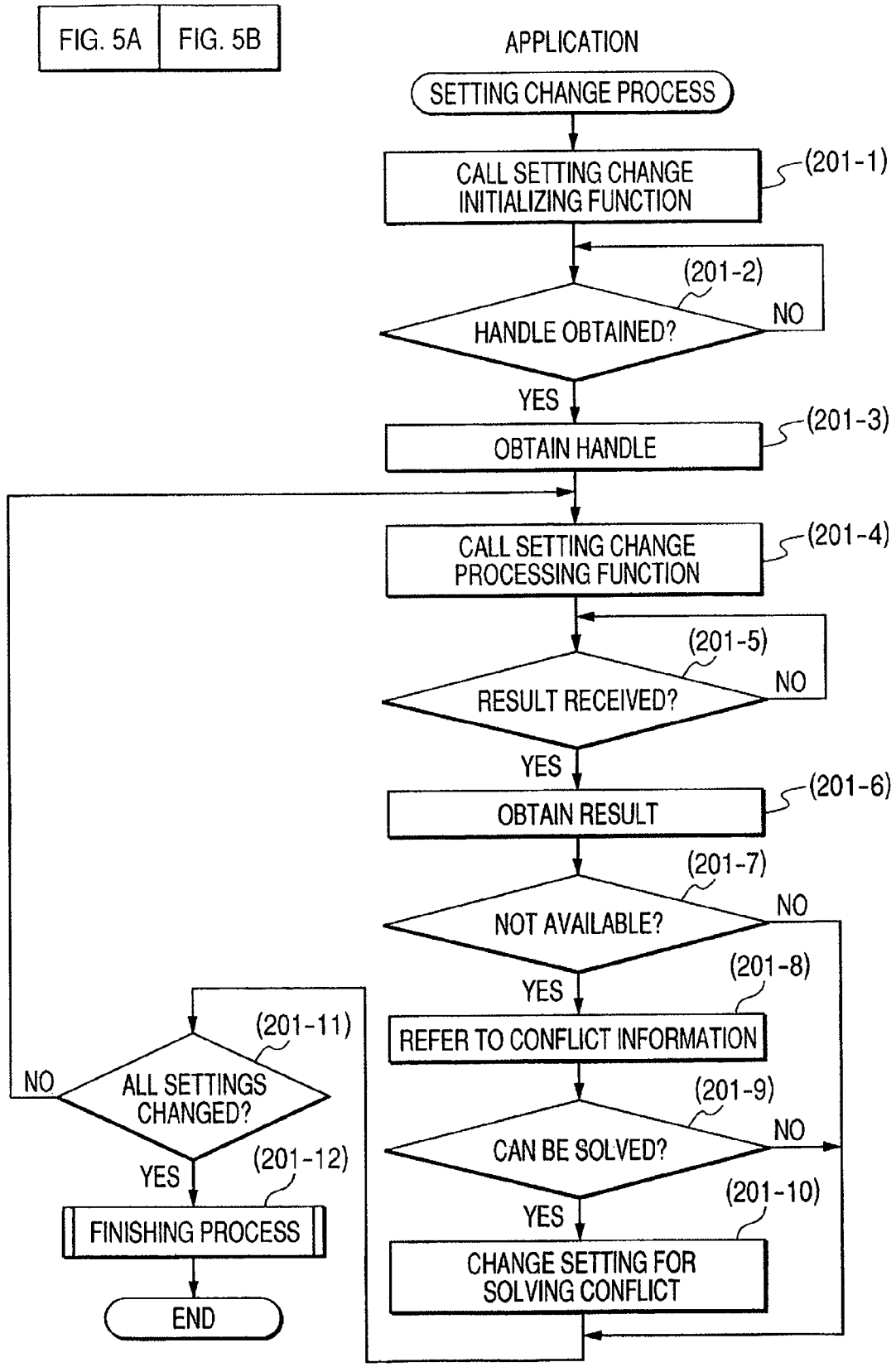
FIG. 5 is a flowchart showing an example of a data processing procedure in the data processing apparatus according to the invention.
Figure 5B:
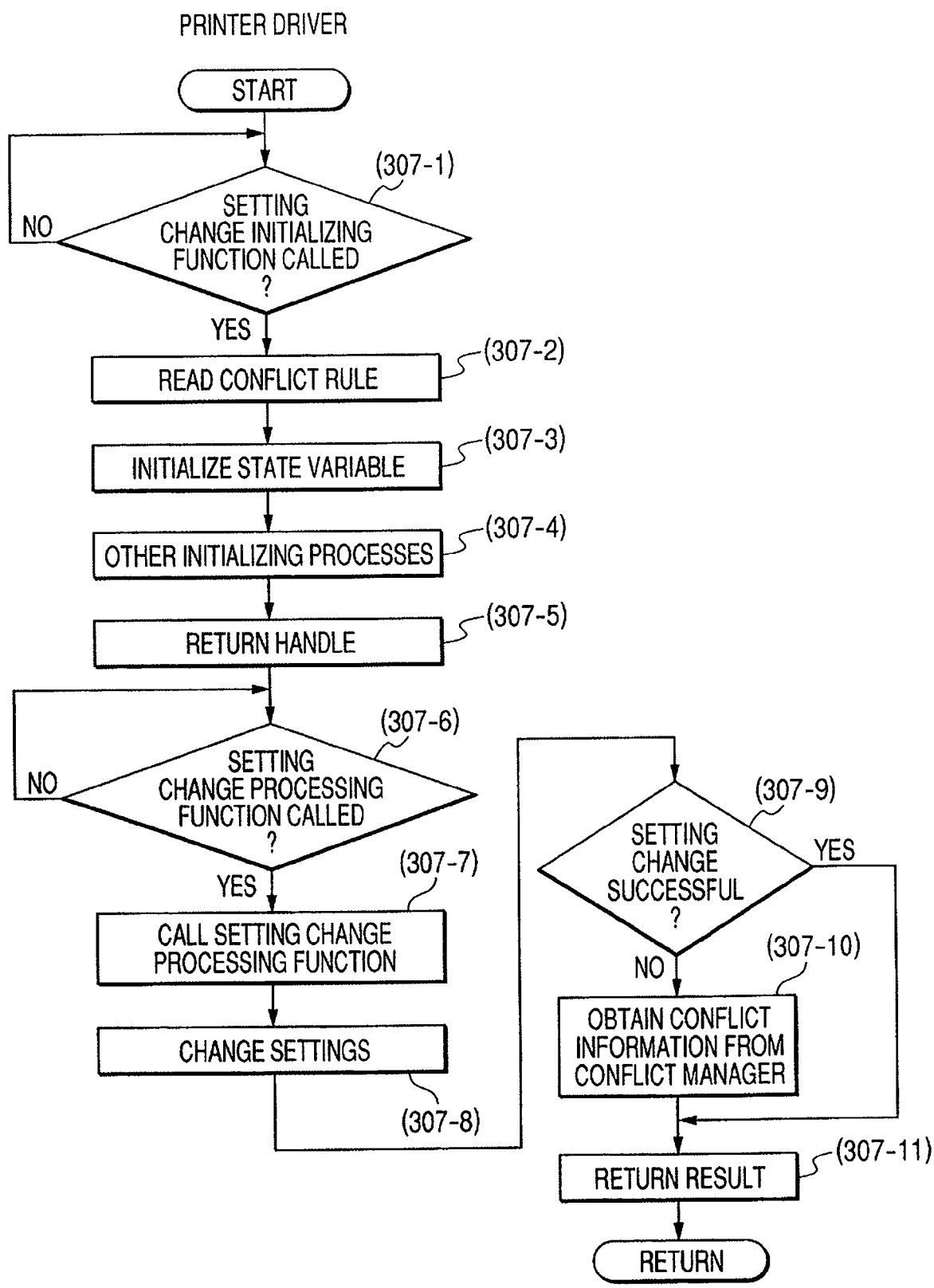

FIG. 5 is a flowchart showing an example of a data processing procedure in the data processing apparatus according to the invention. FIG. 5 corresponds to the procedure for enhancing the contradiction between the expanding function and the present print settings accompanied by the setting changing instruction from the application 201 shown in FIG. 2 and notifying the application 201 of its contents as predetermined response information. Reference numerals (201-1) to (201-12) denote processing steps which are executed by the application 201 and (307-1) to (307-11) denote processing steps which are executed by the printer driver 307 shown in FIG. 5. Processes for changing the print settings from the application 201 by using the functions related to the print setting change process shown in FIG. 4 will be described in detail hereinbelow.

First, the application 201 calls the setting change processing initializing function (which can be also called through the printer driver expansion API 2000) as shown in FIG. 4 and opened by the printer driver managing unit 306 (201-1). In this instance, the print setting information is transferred from the application 201 to the printer driver 307 as an argument of the setting change processing initializing function. When the setting change processing initializing function is called (307-1), the printer driver managing unit 306 reads the print setting information received from the application 201 (307-2) and transfers it to the conflict manager 303. The conflict manager 303 loads the conflict processing rule description file 301 and forms the state variable list 304 on the basis of the received print setting information (307-3).

Figure 6:
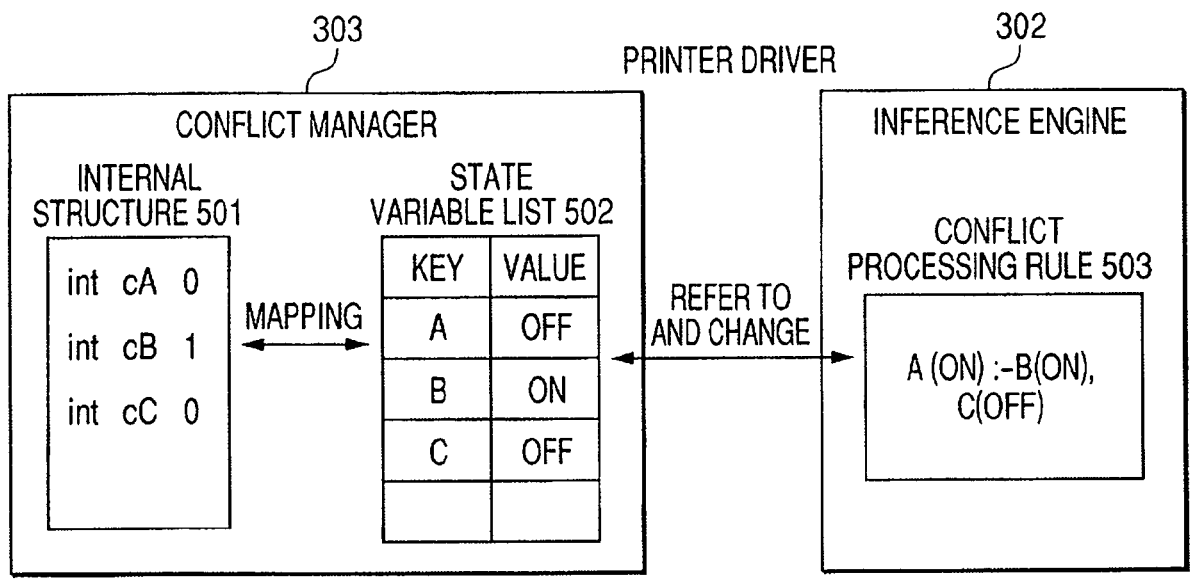
FIG. 6 is a diagram showing a relation between a conflict manager and an inference engine shown in FIG. 3.

FIG. 6 is a diagram showing a relation between the conflict manager 303 and the inference engine 302 shown in FIG. 3.

As shown in a state variable list 502 shown in FIG. 6, with respect to, for example, each of A, B, and C as function names of the printer 1500 shown in FIG. 1 which have been described in the conflict processing rule description file 301, a state variable of the same name exists.

In FIG. 6, data member variables of an internal structure 501 of the printer driver corresponding to the function names A, B, and C of the printer 1500 are assumed to be cA, cB, and cC. It is assumed that a value which the state variable list 502 of A, B, and C has is a binary value (ON, OFF). The internal structure 501 has an initial value as an internal or external file of the driver and the initial value of the state variable depends on the initial value of the corresponding member of the internal structure 501.

Since the initial value of cA is equal to "0", the initial value of the corresponding state variable is a binary value "OFF" corresponding to "0". Values and a method of mapping of the internal structure 501 and the state variables have been programmed as an internal or external file of the driver.

The conflict processing rule description file 301 is referred to in a form included (loaded) in the inference engine 302. The conflict processing rule description file 301 is also referred to by the conflict manager 303 and the state variable list 304 is changed in accordance with the referred file 301. Since the internal structure 305 and the state variable list 304 are interlocked with each other as mentioned above, there is a relation between them where they are mapped with each other.

After the state list was formed, the printer driver managing unit 306 executes other initializing processes (307-4) and, subsequently, returns a handle to the application 201 through the printer driver expansion API 2000 (307-5).

Then, the application 201 waits until the handle sent from the printer driver managing unit 306 through the printer driver expansion API 2000 in step 307-5 is returned (201-2) and obtains such a handle (201-3). The application 201 executes the print setting process by using the obtained handle.

Subsequently, in order to execute the print setting change, the application 201 executes (calls) the setting change processing function opened by the printer driver managing unit 306 shown in FIG. 3 (201-4). The handle obtained in step 201-3, an identifier of the setting item whose setting should be changed, print setting information, and transmission/reception data of the information are included in an argument of the setting change processing function.

When the setting change processing function of the printer driver managing unit 306 is called by the application 201 (307-6), the printer driver managing unit 306 calls the setting change processing function (307-7) and executes the process for changing the setting items on the basis of the information transferred to the argument of the setting change processing function (307-8).

The changing process of the setting items is executed in the following manner. It is assumed that the following conflict processing rule is described as a conflict processing rule.

A(ON):-B (ON), C(OFF)

where, each of A, B, and C unconditionally denotes the name of the function of the printer, respectively. As shown in the state variable list 502, with respect to each of A, B, and C as function names of the printer described in a conflict processing rule 503, a state variable of the same name exists.

The data member variables of the internal structure 501 of the printer driver corresponding to the function names A, B, and C of the printer are assumed to be cA, cB, and cC. It is assumed that the value which the state variable list 502 of A, B, and C has is the binary value (ON, OFF). The internal structure 501 has the initial value as an internal or external file of the driver and the initial value of the state variable depends on the initial value of the corresponding member of the internal structure 501. Since the initial value of cA is equal to "0", the initial value of the corresponding state variable A is the binary value "OFF" corresponding to "0". The values and the method of the mapping of the internal structure 501 and the state variables have been programmed as an internal or external file of the driver.

When the print setting information to be changed is transferred to the conflict manager 303 by the application 201 or a driver UI, the conflict manager 303 searches for the related state variables from the transferred print setting information and changes the values of the state variables in accordance with the transferred values.

At this time, the state variable has a flag and whether or not the value of the state variable can be changed is discriminated on the basis of the flag. This flag has two states of "enable" and "disable". When the value can be changed, the flag is set to "enable". Information showing whether or not the value can be changed is described by the conflict processing rule description file 301 and reflected to the state variable through the inference of the inference engine 302. When the value cannot be changed, that is, when the print setting information is applied to the state variable whose flag is "disable", "NOTAVAILABLE" is returned as a return value without reflecting the print setting information.

The inference engine 302 infers the state variable on the basis of the conflict processing rule description file 301 transferred from the conflict manager 303, thereby evaluating the conflict. When the value of the state variable is changed, the related rules are evaluated by using the value of the state variable, as a key, changed by the inference engine 302.

If the values of other state variables have to be changed in dependence on the evaluation result of the rule, the conflict manager 303 receives a list of the state variables to be changed and a list of the values to be changed from the inference engine 302 and updates each state variable. If the value of the state variable is updated, the conflict processing rule is evaluated again by using the changed state variable as a key. Since there is a possibility that the processing routine enters an infinite loop, the number of times of changing the value of the state variable after the print setting information is transferred is limited to one.

The setting change process by the inference engine 302 based on the following conflict processing rule will now be described.

A(ON):-B(ON), C(OFF), {enable}.

In the above conflict processing rule, it is assumed that the left side of a symbol ":-" is a left side and the right side is a right side. A symbol "," denotes AND as a logic expression; ":" OR as a logic expression; and "." a termination of the rule. The inside sandwiched between symbols { } is used to change a setting possible flag of the state variable. It is assumed that all of the values of A, B, and C are "OFF" as initial values of the state variable.

It is assumed that the print setting information changed by the application 201 or the driver UI is reflected to the state variable and the value of B is set to "ON". The conflict manager 303 inquires of the inference engine 302 about the evaluation result of the conflict processing rule. Since the value of the state variable B has been changed, the inference engine 302 infers the conflict processing rule related to the state variable B.

In the above conflict rule, when the conflict processing rule is evaluated, the value of the state variable B is "ON", and the value of the state variable C is "OFF", the evaluation of the right side of the above conflict processing rule is satisfied and the value of the state variable A of the left side is changed to "ON". At the same time, the setting possible flag of the state variable is changed to "enable".

When the inference of the conflict processing rule by the inference engine 302 is finished, the conflict manager 303 reflects the changed value of the state variable to all of the members of the internal structure 305. That is, since the value of the state variable A is changed from "OFF" to "ON", the member cA of the internal structure 305 is changed from "0" to "1".

The state variable can possess the reason, as data, why its own value has been changed. Such data is called "REASON". "REASON" can be set by describing it into the conflict processing rule as follows.

A(ON):-B(ON), C(OFF), sreason (BONANDCOFF).

WHERE, "sreason" is a special description having such a meaning that "REASON" is set in the conflict processing rule. When the evaluation of the conflict processing rule is satisfied and the state variable A is set to "ON", a value of "BONANDCOFF" is set into "REASON" of the state variable A.

"REASON" can be also succeeded from "REASON" of other state variables. It is described in the conflict processing rule as follows.

A(ON):-B(ON), C(OFF), rreason(B)

where, "rreason" is a special description having such a meaning that "REASON" is obtained and succeeded in the conflict processing rule. When the evaluation of the conflict processing rule is satisfied and the state variable A is set to "ON", "REASON" of the state variable B is set into "REASON" of the state variable A.

The following conflict rule exists as a specific example.

DUPLEX(OFF):-BOOKLET(ON), sreason(BOOKLE-TON), {disable}.

This example shows that when the booklet printing mode is "ON", "OFF" can be shown as "REASON" to the state variable "DUPLEX" by "BOOKLETON". By designating "disable" into the setting possible flag of the state variable "DUPLEX", even if the print setting change process is executed to the state variable "DUPLEX" from now on, "NOTAVAILABLE" is returned. Explanation will be returned to the flowchart shown in FIG. 5. The following values can be mentioned as values which are returned in step 307-8.

"OK": The setting change process is successful.

"NOTAVAILABLE": The setting change is impossible at present due to an influence of other settings.

Subsequently, the printer driver 307 discriminates whether or not the return value of the setting change process is "NOTAVAILABLE" (307-9). If it is decided that the return value is "NOTAVAILABLE" (if NO), step 307-10 follows and the conflict information is obtained by the conflict manager 303.

Figure 7:
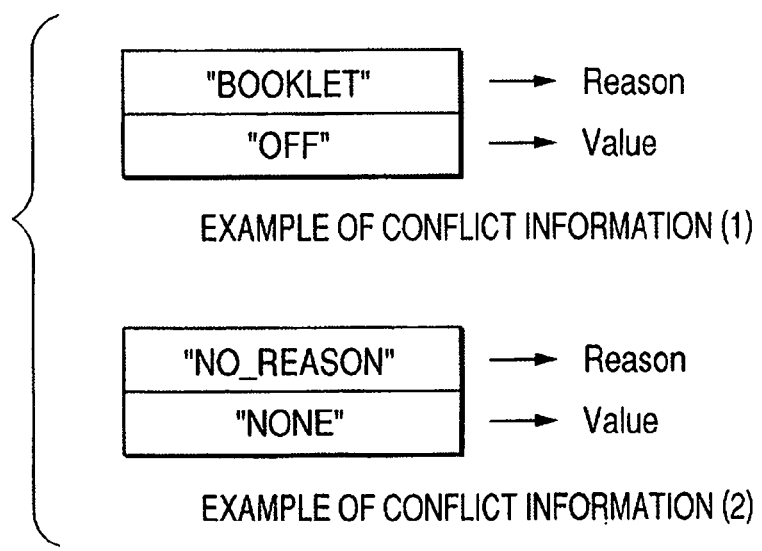
FIG. 7 is a diagram showing an example of conflict information which is obtained from the conflict manager by the driver managing unit shown in FIG. 3.

Information as shown in FIG. 7 is included in the conflict information.

FIG. 7 is a diagram showing an example of the conflict information which is obtained from the conflict manager 303 by the driver managing unit 306 shown in FIG. 3.

The setting items which became factors in disabling the setting because the conflict occurred in the setting change process of step 307-8 have been stored in "Reason" shown in FIG. 7.

Setting values in which the state where the setting change is impossible can be avoided have been stored in "Value" shown in FIG. 7.

"BOOKLET" has been stored in "Reason" of an example (1) of the conflict information in FIG. 7 and it will be understood that the apparatus is in the state where the setting change process is impossible due to the influence of the setting of "BOOKLET". Since "OFF" has been stored in "Value", it is shown that the conflict state is avoided by setting the setting value of "BOOKLET" to "OFF". Since "BOOKLETON" could be obtained as "REASON", "BOOKLET" and "OFF" are stored as corresponding values into the conflict information. The corresponding values have a database as an internal or external file of the driver.

On the other hand, "NO_REASON" has been stored in "Reason" of an example (2) of the conflict information shown in FIG. 7 and it is shown that the setting items which became the factors in the present setting change impossible state do not exist. As a reason why such a situation occurs, a case where since no optional devices are installed, the apparatus is in the state where the designated setting change cannot be performed or the like is presumed instead of the influence of other setting items. In such a case, since the setting for avoiding the conflict state does not exist in "Value" of the conflict information, "NONE" is stored.

Subsequently, after the conflict information obtained in step 307-10 is stored into the transmission/reception data of the information of the last argument transferred in step 307-6, a result indicative of the failure is returned to the application 201 through the printer driver expansion API 2000 (307-11) and the processing routine is finished.

If the answer is "OK" (the setting change is successful; YES) in step 307-9, a result indicative of such a fact is returned to the application 201 (307-11) and the processing routine is finished.

When the result of the setting change process executed in step 307-8 which was returned from the printer driver managing unit 306 through the printer driver expansion API 2000 in step 307-11 is received (201-5), the application 201 obtains the returned result of the setting change process (201-6).

Subsequently, the application 201 discriminates whether or not the obtained result is "NOTAVAILABLE" (201-7). If it is NO (that is, the obtained result indicates "AVAILABLE"), step 201-11 follows.

If it is decided in step 201-7 that the obtained result is "NOTAVAILABLE", step 201-8 follows. The conflict information obtained by the printer driver managing unit 306 and transferred to the argument of the setting change processing function is referred to.

The application 201 discriminates from the referred conflict information whether or not the conflict can be solved (201-9). If it is determined that "NO_REASON" has been stored in "Reason" in the conflict information, step 201-10 follows. If it is determined that some setting item has stored in "Reason" in the conflict information, "Value" in the conflict information is referred to, the setting values stored in "Value" are set into the setting items in "Reason" by using the setting change processing function F2 shown in FIG. 4 (201-10), and the state where the setting change process cannot be executed in step 307-8 is avoided.

Subsequently, the application 201 discriminates whether or not all of the setting change processes have been finished (201-11). If it is decided that all of them are not finished yet, the processing routine is returned to step 201-4 and the setting change processing function is called. The series of processes is repeated until the necessary setting process is finished.

If it is decided in step 201-11 that all of the setting change processes have been finished, the setting change processing finishing function F3 shown in FIG. 4 is executed (201-12) and the processing routine is finished.

By the above processes, the situation where the application 201 cannot execute the print setting change process due to the influence of other print settings can be avoided by itself.

Figure 9:
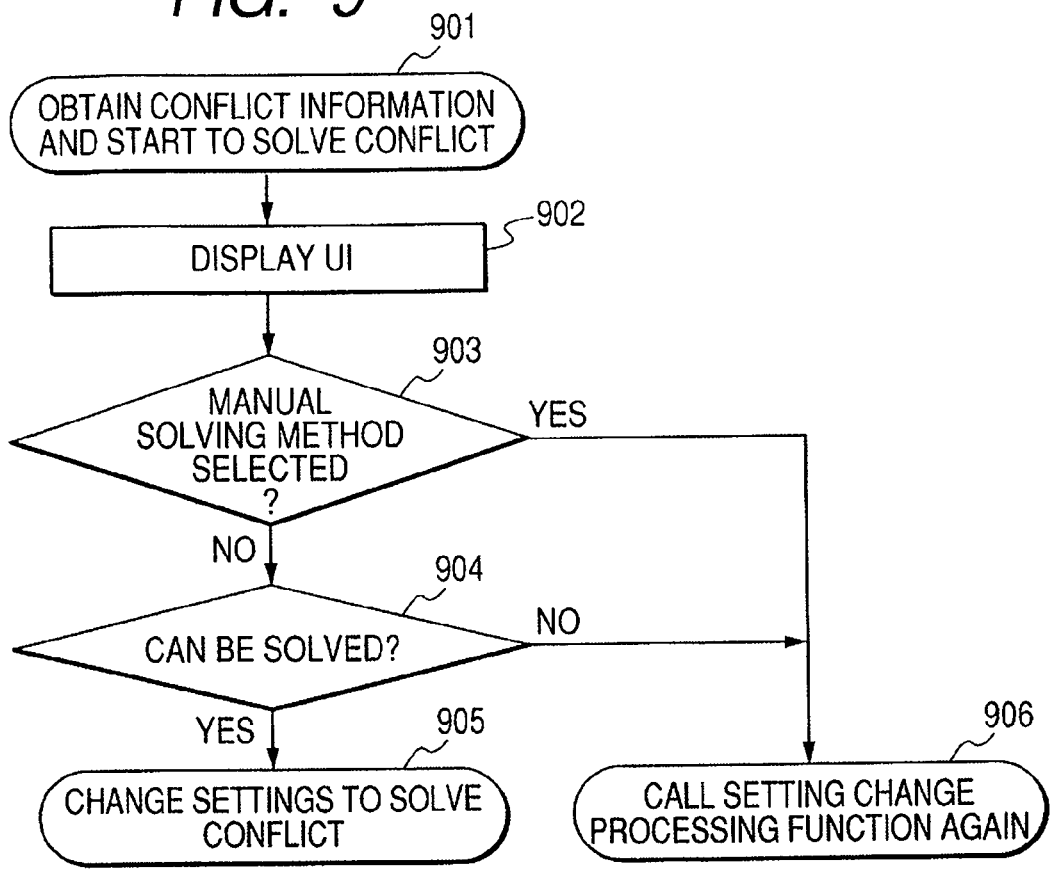
FIG. 9 is a flowchart in the case of using a user interface in order to solve a conflict.
Figure 10:
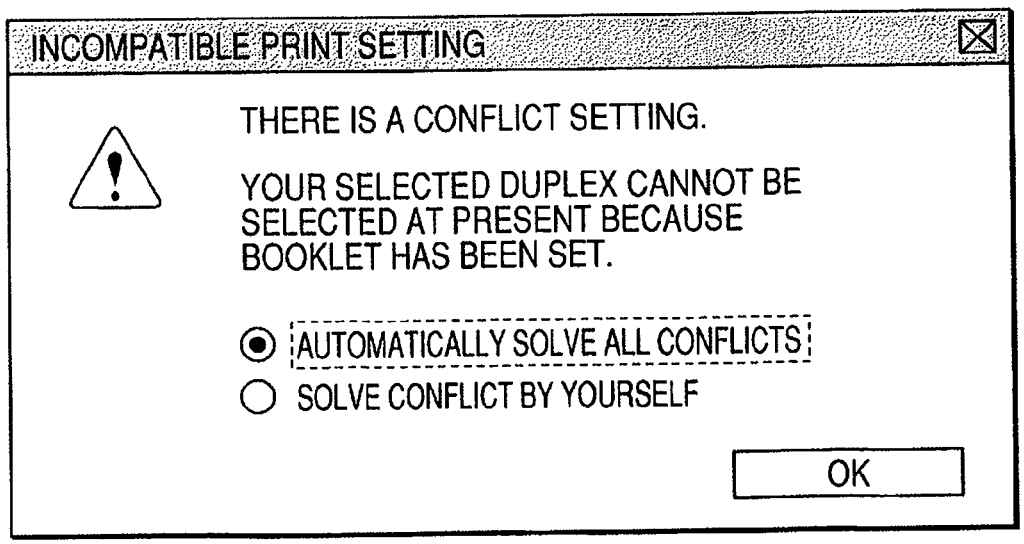
FIG. 10 shows the user interface to solve the conflict.

When discriminating whether or not the conflict can be solved from the conflict information referred to by the application 201 (201-9), the application 201 can also display a user interface and inquire of the user. FIG. 9 is a detailed flowchart when the user interface is displayed in step 201-9 and explanation will be made with reference to FIG. 9. First, a user interface shown in FIG. 10 is displayed in step 902. At this time, since the setting change processing function is called by "DUPLEX" (201-4) and "BOOKLET" has been stored in "Reason" in the conflict information, a message showing that "DUPLEX" cannot be set due to "BOOKLET" in the case of using the characters on the user interface is displayed. In this instance, either an "automatic" mode in which the application solves the conflict or a "manual" mode in which the user calls the setting change processing function again by himself can be selected (903). When the method of solving by the "manual" mode is selected, if all of the setting changes are not fully finished (201-11), the processing routine is returned to step 201-4 to call the setting change processing function. Even when the "automatic" mode is selected, if the conflict cannot be solved (904), the processing routine is also similarly returned to step 201-4. When the conflict can be solved, the setting change is performed (905) and the processing routine advances. This process is equivalent to the operation in step 201-10. In the conflict, a background printing in which a latent image that is emphasized when it is copied and a background image that is not emphasized even if it is copied are overlaid is also considered. When the background printing of the copy restraint has been set, in response to the operation to input a mode for setting the layout of "2-in-1", the printer driver can also notify the application 201 of a message showing "the "2-in-1" cannot be set because the background printing for the copy restraint has already been set". In response to this notification, the application changes the display of the graphical user interface (GUI) possessed by itself. The user sees the message showing "the "2-in-1" cannot be set because the background printing for the copy restraint has already been set" which is displayed in the GUI of the application. Subsequently, the user sees the message displayed in the application and determines whether the setting is changed or continued.

In the embodiment, it is assumed that the medium to record the print processing related program 204 is the external memory 11. However, any one of an FD, an HD drive, a CD-ROM, an IC memory card, and the like can be also used as an external memory. Further, it is also possible to construct the apparatus in such a manner that the sole present print program is recorded into the ROM 3 or it is recorded together with the OS or another program which operates on the host computer and it/they are directly executed as a part of the memory map by the CPU 1.

According to the embodiment as described above, in the environment in which the function expansion of the printer driver is realized in the plug-in format, in the case where the function expanded by the plug-in is controlled by using the special interface from the application, the situation where the setting change process cannot be realized due to the influence of other print settings can be avoided, and the desired print settings can be realized from the application.

Second Embodiment

A construction of the data processing program which can be read by the data processing apparatus according to invention will be described hereinbelow with reference to the memory map shown in FIG. 8.

FIG. 8 is a diagram for explaining the memory map of a storing medium to store various data processing programs which can be read by the data processing apparatus according to the invention.

Although not particularly shown, there is also a case where information to manage a group of programs which are stored in the storing medium, for example, version information, implementors, and the like are also stored and information which depends on the OS or the like on the program reading side, for example, icons to identify and display the programs and the like are also stored.

Further, data which depends on various programs is also managed in the directory. There is also a case where a program to install the various programs into a computer and, if the installing program has been compressed, a program for decompressing it and the like are also stored.

The functions shown in FIG. 5 in the embodiment can be also executed by the host computer in accordance with a program which is installed from the outside. In such a case, the invention can be also applied to the case where an information group including the programs is supplied to an output apparatus by a storing medium such as CD-ROM, flash memory, FD, or the like or from an external storing medium through a network.

As mentioned above, naturally, the object of the invention is accomplished by a method whereby the storing medium in which program codes of software to realize the functions of the embodiments mentioned above have been recorded is supplied to a system or an apparatus and a computer (or a CPU or an MPU) of the system or apparatus reads out and executes the program codes stored in the storing medium.

In this case, the program codes themselves read out of the storing medium realize the novel functions of the invention and the storing medium in which the program codes have been stored constructs the invention.

Therefore, a form of the program is not limited but any of object codes, a program which is executed by an interpreter, script data which is supplied to the OS, and the like can be used so long as it has the functions of the programs.

As a storing medium to supply the program, for example, a flexible disk, a hard disk, an optical disk, a magnetooptic disk, an MO, a CD-ROM, a CD-R, a CD-RW, a magnetic tape, a non-volatile memory card, a ROM, a DVD, or the like can be used.

In this case, the program codes themselves read out of the storing medium realize the functions of the embodiments mentioned above and the storing medium in which the program codes have been stored constructs the invention.

As another program supplying method, the program can be also supplied by a method whereby the computer is connected to Homepage of the Internet by using a browser of the client computer, the computer program itself of the invention is supplied from Homepage or a compressed file including an automatic installing function is downloaded onto the recording medium such as a hard disk or the like. The program supplying method can be also realized by a method whereby the program codes constructing the program of the invention are divided into a plurality of files and each file is downloaded from different Homepage. That is, a WWW server, an ftp server, or the like for downloading a program file to realize the function processes of the invention by the computer to a plurality of users is also incorporated in Claims of the invention.

The program supplying method can be also realized by a method whereby the program of the invention is encrypted, stored into the storing medium such as a CD-ROM or the like, and distributed to the user, the user who satisfies predetermined conditions is allowed to download key information to decrypt the encryption from Homepage through the Internet, execute the encrypted program by using the key information, and install it into the computer.

Naturally, the invention incorporates not only the case where the computer executes the read-out program codes, so that the functions of the embodiments mentioned above are realized but also the case where the OS (Operating System) or the like which is operating on the computer executes a part or all of actual processes on the basis of instructions of the program codes and the functions of the embodiments mentioned above are realized by those processes.

Further, naturally, the invention incorporates the case where the program codes read out of the storing medium are written into a memory provided for a function expanding board inserted in the computer or a function expanding unit connected to the computer, thereafter, a CPU or the like provided for the function expanding board or the function expanding unit executes a part or all of actual processes on the basis of instructions of the program codes, and the functions of the embodiments mentioned above are realized by those processes.

The invention is not limited to the foregoing embodiments but many variations and modifications (including an organic combination of the embodiments) are possible on the basis of the spirit of the invention and they are not excluded from the scope of the invention.

Although the embodiments of the invention have been described above, it will be obviously understood by those skilled in the art that the spirit and scope of the invention are not limited to the specific explanation in the specification but the following embodiments are also incorporated.

A data processing apparatus for processing a print request from an application (application 201 shown in FIG. 3) through a printer driver, comprising: a holding unit adapted to hold a conflict processing rule (conflict processing rule description file 301 shown in FIG. 3) for evaluating functions in which the simultaneous setting by the printer driver is impossible; a discriminating unit (inference engine 302 shown in FIG. 3) adapted to discriminate whether or not the print setting can be changed in accordance with an inquiry about the conflict from the printer driver by obtaining the conflict processing rule when a print setting change instruction to the printer driver from the application is made, thereby forming predetermined response information; and a notifying unit (printer driver managing unit 306 shown in FIG. 3) adapted to notify the application, through the printer driver, of the predetermined response information formed by the discriminating unit.

Thus, a kind of contradiction occurring between the print setting of the application side and the function set by the printer driver is understood and the print setting processing environment having excellent use convenience in which the setting can be automatically changed to the print setting in which no contradiction occurs between the set function and the setting of the application side can be easily constructed.

If it is determined by the discriminating unit that the print setting cannot be changed, the predetermined response information can be also formed from both of the reason why it cannot be changed and the information showing the setting to avoid the setting impossible state.

Thus, the response information by which the application can understand the kind of contradiction occurring between the print setting of the application side and the function set by the printer driver can be formed.

As a reason why the setting value could not be set, the notifying unit may notify the application, through the printer driver, of the predetermined response information including another setting value which cannot be set because it has been set before and a setting value whose setting change is necessary to enable the setting.

Therefore, after understanding the kind of contradiction occurring between the print setting of the application side and the function set by the printer driver, the consistent print setting can be automatically made without being accompanied with the setting change by the user and the ease of use is improved.

The application can also set again the print setting values which are effective to avoid the conflict into the printer driver on the basis of the predetermined response information notified through the printer driver.

Therefore, after understanding the kind of contradiction occurring between the print setting of the application side and the function set by the printer driver, the consistent print setting values can be automatically set into the printer driver without being accompanied with the setting change by the user.

The notifying unit may also allow the printer driver to notify the application of the response information through the printer driver expansion API.

Thus, the application can be certainly notified of the response information.

A print setting processing method in a data processing apparatus which has a holding unit adapted to hold a conflict processing rule for evaluating functions in which the simultaneous setting by a printer driver is impossible and processes a print request from an application through the printer driver, comprising: a discriminating step (steps (307-1) to (307-10) shown in FIG. 5) of discriminating whether or not the print setting can be changed in accordance with an inquiry about the conflict from the printer driver by obtaining the conflict processing rule when a print setting change instruction to the printer driver from the application is made and forming predetermined response information; and a notifying step (step (307-11) shown in FIG. 5) of notifying the application, through the printer driver, of the predetermined response information formed in the discriminating step.

In the discriminating step, if it is determined that the print setting cannot be changed, the predetermined response information can be also formed from both of the reason why it cannot be changed and the information showing the setting to avoid the setting impossible state.

In the notifying step, as a reason why the setting value could not be set, the application can be notified, through the printer driver, of the predetermined response information including another setting value which cannot be set because it has been set before and a setting value whose setting change is necessary to enable the setting.

The application can also set again the print setting values which are effective to avoid the conflict into the printer driver on the basis of the predetermined response information notified through the printer driver.

In the notifying step, the printer driver may notify the application of the response information through the printer driver expansion API.

This application claims priority from Japanese Patent Application Nos. 2004-330475 filed Nov. 15, 2004, and 2005-310795 filed Oct. 26, 2005, which are hereby incorporated by reference herein.

What is claimed is:
1. A data processing apparatus comprising:
 a holding unit adapted to hold a conflict processing rule for evaluating a conflict occurring between settings set by a printer driver or occurring between setting by the printer driver and a function of a printer;
 a setting unit adapted to perform setting on the printer driver based on a function expansion, the function expansion being executed by applying an add-in program to the printer driver, the setting being performed on a display screen provided by an application, the setting including a background printing for copy restraint;
 a discriminating unit adapted to discriminate, when the printer driver receives the setting performed by said setting unit from the application, whether or not a conflict occurs between the settings set by the printer driver and the received setting, based on the conflict processing rule held by said holding unit;
 a creating unit adapted to create, when said discriminating unit discriminates a conflict occurs by the received setting, response information including a reason why the conflict occurs;
 a notifying unit adapted to notify the application of the response information created by said creating unit from the printer driver through a printer driver expansion API;
 a display unit adapted to display a screen of the application for presenting the reason why the conflict occurs and for prompting an instruction to solve the conflict, based on the response information notified by said notifying unit, wherein the instruction is selectable on the screen from an automatic solving instruction and a manual solving instruction; and a resetting unit adapted to reset, as a function of the printer driver, the setting to solve the conflict in accordance with the instruction input via the screen displayed by said display unit and notified from the application.

2. A data processing apparatus according to claim 1, wherein said creating unit creates the response information from the reason why the conflict occurs and from information which indicates setting to solve the conflict, and wherein said resetting unit resets the setting to solve the conflict based on the information which indicates setting to solve the conflict in accordance with the instruction notified from the application.

3. An apparatus according to claim 1, wherein as the reason why the conflict occurs, said notifying unit notifies the application of the response information including another setting value which was previously set and caused the conflict to occur and a setting value whose setting change is necessary to enable the setting.

4. A data processing method comprising:

a holding step of holding a conflict processing rule for evaluating a conflict occurring between settings set by a printer driver or occurring between setting by the printer driver and a function of a printer;

a setting step of performing setting on the printer driver based on a function expansion, the function expansion being executed by applying an add-in program to the printer driver, the setting being performed on a display screen provided by an application, the setting including a background printing for copy restraint;

a discriminating step of discriminating, when the printer driver receives the setting performed by said setting unit from the application, whether or not a conflict occurs between the settings set by the printer driver and the received setting, based on the conflict processing rule held in said holding step;

a creating step of creating, when said discriminating step discriminates a conflict occurs by the received setting, response information including a reason why the conflict occurs;

a notifying step of notifying the application of the response information created in said creating step from the printer driver through a printer driver expansion API;

a displaying step of displaying a screen of the application for presenting the reason why the conflict occurs and for prompting an instruction to solve the conflict, based on the response information notified in said notifying step, wherein the instruction is selectable on the screen from an automatic solving instruction and a manual solving instruction; and a resetting step of resetting, as a function of the printer driver, the setting to solve the conflict in accordance with the instruction input via the screen displayed in said displaying step and notified from the application.

5. A method according to claim 4, wherein said creating step creates the response information from the reason why the conflict occurs and from information which indicates setting to solve the conflict; and wherein said resetting step resets the setting to solve the conflict based on the information which indicates setting to solve the conflict in accordance with the instruction notified from the application.

6. A method according to claim 4, wherein in said notifying step, as the reason why the conflict occurs, said application is notified of the response information including another setting value which was previously set and caused the conflict to occur and a setting value whose setting change is necessary to enable the setting.

7. A control program, stored in a non-transitory computer-readable storage medium, for causing a computer to execute a data processing method, the data processing method comprising:

a holding step of holding a conflict processing rule for evaluating a conflict occurring between settings set by a printer driver or occurring between setting by the printer driver and a function of a printer;

a setting step of performing setting on the printer driver based on a function expansion, the function expansion being executed by applying an add-in program to the printer driver, the setting being performed on a display screen provided by an application, the setting including a background printing for copy restraint;

a discriminating step of discriminating, when the printer driver receives the setting performed by said setting unit from the application, whether or not a conflict occurs between the settings set by the printer driver and the received setting, based on the conflict processing rule held in said holding step;

a creating step of creating, when said discriminating step discriminates a conflict occurs by the received setting, response information including a reason why the conflict occurs;

a notifying step of notifying the application of the response information created in said creating step from the printer driver through a printer driver expansion API;

a displaying step of displaying a screen of the application for presenting the reason why the conflict occurs and for prompting an instruction to solve the conflict, based on the response information notified in said notifying step, wherein the instruction is selectable on the screen from an automatic solving instruction and a manual solving instruction; and a resetting step of resetting, as a function of the printer driver, the setting to solve the conflict in accordance with the instruction input via the screen displayed in said displaying step and notified from the application.

* * * * *